US 012231577B2

(12) United States Patent (10) Patent No.: US 12,231,577 B2
Hanna et al. (45) Date of Patent: *Feb. 18, 2025

(54) SYSTEM AND METHOD FOR CAPTURING AUTHENTICATABLE DIGITAL MEDIA FILES ON CONNECTED MEDIA-CAPTURE DEVICES

(71) Applicant: TruePic Inc., La Jolla, CA (US)

(72) Inventors: Sherif Hanna, Carlsbad, CA (US); Thomas Zeng, San Diego, CA (US); Chi Shing Chan, San Diego, CA (US); Matthew Robben, Loveland, OH (US)

(73) Assignee: TruePic Inc., San Diego, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/685,877

(22) Filed: Mar. 3, 2022

(65) Prior Publication Data

US 2022/0294640 A1 Sep. 15, 2022

Related U.S. Application Data

(60) Provisional application No. 63/159,048, filed on Mar. 10, 2021.

(51) Int. Cl.
*H04L 9/32* (2006.01)
*H04L 9/08* (2006.01)
*H04L 67/1097* (2022.01)

(52) U.S. Cl.
CPC .......... *H04L 9/3247* (2013.01); *H04L 9/0825* (2013.01); *H04L 9/0891* (2013.01);
(Continued)

(58) Field of Classification Search
CPC ... H04L 9/3247; H04L 9/0825; H04L 9/0891; H04L 9/3236; H04L 9/3263; H04L 63/0823; H04L 63/12; H04L 2209/26
(Continued)

(56) References Cited

U.S. PATENT DOCUMENTS 5,351,134 A 9/1994 Yaguchi
5,499,294 A 3/1996 Friedman
(Continued)

FOREIGN PATENT DOCUMENTS

CN 101258744 A 9/2008
CN 102687159 A 9/2012
(Continued)

OTHER PUBLICATIONS

Anjum, Areesha, et al., "Recapture Detection Technique Based on Edge-Types by Analysing High-Frequency Components in Digital Images Acquired through LCD Screens", Multimedia Tools and Applications, vol. 79, Springer, 2020 (Year: 2020), pp. 6965-6985.
(Continued)

*Primary Examiner* — Meng Vang
(74) *Attorney, Agent, or Firm* — Sheppard Mullin Richter & Hampton LLP

(57) ABSTRACT

A media-capture device initiates acquisition of sensor data samples representing analog phenomena; encodes the samples; generates a to-be-signed data structure comprising the encoded samples and/or cryptographic hashes of the samples; generates a cryptographic hash of the to-be-signed data structure; transmits a time-stamping request to a time-stamping server, the time-stamping request comprises the cryptographic hash of the to-be-signed data structure, wherein the time-stamping server generates a signed time-stamp; generates a digital signature using the to-be-signed data structure, the signed time-stamp, a private cryptographic key, and a signed certificate for the corresponding public cryptographic key; and generates a second data structure comprising the samples, the to-be-signed data structure, and the digital signature.

20 Claims, 6 Drawing Sheets

(52) U.S. Cl.
CPC .......... *H04L 9/3236* (2013.01); *H04L 9/3297* (2013.01); *H04L 67/1097* (2013.01)

(58) Field of Classification Search
USPC ........................................................ 713/168
See application file for complete search history.

(56) References Cited

U.S. PATENT DOCUMENTS

| | | |
|---|---|---|
| 6,342,290 B1 | 1/2002 | Conk |
| 6,411,725 B1 | 6/2002 | Rhoads |
| 6,487,301 B1 | 11/2002 | Zhao |
| 6,557,102 B1 | 4/2003 | Wong |
| 6,628,417 B1 | 9/2003 | Naito |
| 6,823,075 B2 | 11/2004 | Perry |
| 6,947,571 B1 | 9/2005 | Rhoads |
| 7,209,571 B2 | 4/2007 | Davis |
| 7,277,576 B2 | 10/2007 | Abbate |
| 7,525,578 B1 | 4/2009 | Barbeau |
| 7,616,777 B2 | 11/2009 | Rodriguez |
| 7,958,458 B2 | 6/2011 | Maeta |
| 8,121,342 B2 | 2/2012 | Davis |
| 8,413,882 B1 | 4/2013 | Nidamarthi |
| 8,443,001 B2 | 5/2013 | Nichols |
| 8,462,209 B2 | 6/2013 | Sun |
| 8,849,819 B2 | 9/2014 | Johnson |
| 8,868,039 B2 | 10/2014 | Rodriguez |
| 8,879,120 B2 | 11/2014 | Thrasher |
| 8,955,137 B2 | 2/2015 | Mousty |
| 9,002,719 B2 | 4/2015 | Tofte |
| 9,082,235 B2 | 7/2015 | Lau |
| 9,300,678 B1 | 3/2016 | Stack |
| 9,594,980 B1 | 3/2017 | Graham |
| 9,609,288 B1 | 3/2017 | Richman |
| 9,614,886 B2 | 4/2017 | Zhong |
| 9,621,565 B2 | 4/2017 | Stack |
| 9,652,460 B1 | 5/2017 | Barisic |
| 9,779,775 B2 | 10/2017 | Pacurariu |
| 9,832,017 B2 | 11/2017 | Malone |
| 9,910,865 B2 | 3/2018 | Mikolajczyk |
| 10,013,568 B2 | 7/2018 | Mityagin |
| 10,095,877 B2 | 10/2018 | Stack |
| 10,102,526 B1 | 10/2018 | Madisetti |
| 10,255,419 B1 | 4/2019 | Kragh |
| 10,277,400 B1* | 4/2019 | Griffin .................. H04L 9/3231 |
| 10,360,668 B1 | 7/2019 | McGregor |
| 10,361,866 B1 | 7/2019 | McGregor |
| 10,375,050 B2 | 8/2019 | Lyons |
| 10,389,733 B2 | 8/2019 | Fasoli |
| 10,404,477 B1* | 9/2019 | Deck .................. H04L 9/3247 |
| 10,467,507 B1 | 11/2019 | Hao |
| 10,635,894 B1 | 4/2020 | Genner |
| 10,726,533 B2 | 7/2020 | McGregor |
| 10,733,315 B2 | 8/2020 | Stack |
| 11,037,284 B1 | 6/2021 | Rice |
| 11,159,504 B2 | 10/2021 | Lyons |
| 11,256,792 B2 | 2/2022 | Tussy |
| 11,334,687 B2 | 5/2022 | Stack |
| 11,373,449 B1 | 6/2022 | Genner |
| 11,544,835 B2 | 1/2023 | Rice |
| 11,646,902 B2 | 5/2023 | McGregor |
| 2002/0056043 A1* | 5/2002 | Glass .................. G06F 21/32 713/179 |
| 2003/0065922 A1 | 4/2003 | Fredlund |
| 2004/0039912 A1 | 2/2004 | Borrowman |
| 2004/0091111 A1 | 5/2004 | Levy |
| 2004/0153649 A1 | 8/2004 | Rhoads |
| 2004/0213437 A1 | 10/2004 | Howard |
| 2005/0125668 A1 | 6/2005 | Botz |
| 2005/0273368 A1 | 12/2005 | Hutten |
| 2006/0018506 A1 | 1/2006 | Rodriguez |
| 2006/0036864 A1 | 2/2006 | Parulski |
| 2006/0115111 A1 | 6/2006 | Malone |
| 2006/0120562 A1 | 6/2006 | Fudge |
| 2006/0157559 A1 | 7/2006 | Levy |
| 2006/0218404 A1 | 9/2006 | Ogura |
| 2006/0262976 A1 | 11/2006 | Hart |
| 2007/0019836 A1 | 1/2007 | Thorwirth |
| 2007/0091376 A1 | 4/2007 | Calhoon |
| 2007/0162756 A1 | 7/2007 | Fredlund |
| 2007/0171288 A1 | 7/2007 | Inoue |
| 2008/0005086 A1 | 1/2008 | Moore |
| 2009/0044235 A1 | 2/2009 | Davidson |
| 2009/0320101 A1 | 12/2009 | Doyle |
| 2010/0046748 A1 | 2/2010 | Kusnoto |
| 2010/0250953 A1 | 9/2010 | Wiersma |
| 2010/0281475 A1 | 11/2010 | Jain |
| 2010/0309987 A1 | 12/2010 | Concion |
| 2010/0317399 A1 | 12/2010 | Rodriguez |
| 2011/0085728 A1 | 4/2011 | Gao |
| 2011/0087690 A1 | 4/2011 | Cairns |
| 2011/0156879 A1 | 6/2011 | Matsushita |
| 2011/0221568 A1 | 9/2011 | Giobbi |
| 2011/0231645 A1 | 9/2011 | Thomas |
| 2011/0258326 A1 | 10/2011 | Hu |
| 2012/0004949 A1 | 1/2012 | Coleman |
| 2012/0143630 A1 | 6/2012 | Hertenstein |
| 2012/0269425 A1 | 10/2012 | Marchesotti |
| 2012/0278370 A1 | 11/2012 | Nichols |
| 2012/0311623 A1 | 12/2012 | Davis |
| 2013/0041948 A1 | 2/2013 | Tseng |
| 2014/0049653 A1 | 2/2014 | Leonard |
| 2014/0081932 A1 | 3/2014 | Krislov |
| 2014/0198687 A1 | 7/2014 | Raleigh |
| 2014/0244781 A1 | 8/2014 | Klayko |
| 2014/0279493 A1 | 9/2014 | Kamath |
| 2014/0297810 A1 | 10/2014 | Zhong |
| 2014/0324986 A1 | 10/2014 | Zhang |
| 2014/0358964 A1 | 12/2014 | Woods |
| 2015/0016661 A1 | 1/2015 | Lord |
| 2015/0142595 A1 | 5/2015 | Acuna-Rohter |
| 2015/0154436 A1 | 6/2015 | Shi |
| 2015/0213324 A1 | 7/2015 | Farid |
| 2015/0310306 A1 | 10/2015 | Song |
| 2016/0162729 A1 | 6/2016 | Hagen |
| 2016/0224768 A1 | 8/2016 | Boccon-Gibod |
| 2016/0301531 A1 | 10/2016 | Finlow-Bates |
| 2016/0379330 A1 | 12/2016 | Powers |
| 2017/0041306 A1 | 2/2017 | Stack |
| 2017/0041328 A1 | 2/2017 | Stack |
| 2017/0048216 A1 | 2/2017 | Chow |
| 2017/0093867 A1 | 3/2017 | Burns |
| 2017/0118493 A1 | 4/2017 | Hain |
| 2017/0178058 A1 | 6/2017 | Bhat |
| 2017/0180277 A1 | 6/2017 | Brady |
| 2017/0193329 A1 | 7/2017 | Suman |
| 2017/0193594 A1 | 7/2017 | Glasgow |
| 2017/0295232 A1 | 10/2017 | Curtis |
| 2017/0359326 A1 | 12/2017 | Garcia |
| 2017/0373847 A1* | 12/2017 | Chien .................. H04L 9/3221 |
| 2017/0373859 A1 | 12/2017 | Shors |
| 2017/0374622 A1 | 12/2017 | Juhani |
| 2018/0019873 A1 | 1/2018 | Kraemer |
| 2018/0026932 A1 | 1/2018 | Wang |
| 2018/0048474 A1 | 2/2018 | Landrock |
| 2018/0260888 A1 | 9/2018 | Paolini-Subramanya |
| 2018/0357501 A1 | 12/2018 | Ma |
| 2018/0365442 A1 | 12/2018 | Stack |
| 2019/0042722 A1* | 2/2019 | Hansen .................. G06F 21/44 |
| 2019/0095655 A1* | 3/2019 | Krawczewicz ....... H04L 9/3249 |
| 2019/0109834 A1 | 4/2019 | Lyons |
| 2019/0109981 A1 | 4/2019 | Zhang |
| 2019/0147305 A1 | 5/2019 | Lu |
| 2019/0164285 A1 | 5/2019 | Nye |
| 2019/0251349 A1 | 8/2019 | Duerksen |
| 2019/0281259 A1 | 9/2019 | Palazzolo |
| 2019/0391972 A1 | 12/2019 | Bates |
| 2020/0007331 A1* | 1/2020 | Wentz .................. H04L 9/006 |
| 2020/0012806 A1 | 1/2020 | Bates |
| 2020/0126209 A1 | 4/2020 | Kim |
| 2020/0210768 A1 | 7/2020 | Turkelson |
| 2021/0004949 A1 | 1/2021 | Broyda |

(56) References Cited

U.S. PATENT DOCUMENTS

| | | | | |
|---|---|---|---|---|
| 2021/0377262 | A1* | 12/2021 | Butler | G06F 21/32 |
| 2022/0179998 | A1 | 6/2022 | Lamplmair | |

FOREIGN PATENT DOCUMENTS

| | | |
|---|---|---|
| CN | 104079830 A | 10/2014 |
| CN | 103345758 B | 8/2016 |
| EP | 3099058 | 11/2016 |
| JP | 2012164064 | 8/2012 |
| WO | 9909743 | 2/1999 |
| WO | 0152178 | 7/2001 |
| WO | 0227431 A2 | 4/2002 |
| WO | 2015020601 A1 | 2/2015 |
| WO | 2017023896 | 2/2017 |

OTHER PUBLICATIONS

Chingovska, Ivana, et al., "On the Effectiveness of Local Binary Patterns in Face Anti-Spoofing", 2012 International Conference on the Biometrics Special Interst Group (BIOSIG), 2012 (Year: 2012), pp. 1-7.

Li, Haoliang, et al., "Image Recapture Detection with Convolutional and Recurrent Neural Networks", Society for Imaging Science and Technology, 2017 (Year: 2017), pp. 87-91.

Liu, Huacheng, et al., "Recaptured Image Detection Based on DCT Coefficients", Journal of Computational Information Systems, vol. 9, No. 20, 2013 (Year: 2013), pp. 8139-8145.

Maatta, J., et al., "Face Spoofing Detection from Single Images Using Texture and Local Shape Analysis", IET Biometrics, 2012 (Year: 2012), pp. 3-10.

Patel, Keyurkumar, et al., "Secure Face Unlock: Spoof Detection on Smartphones", IEEE Transactions on Informatoin Forensics and Security, vol. 11, No. 10, Oct. 2016 (Year: 2016), pp. 2268-2283.

Peixoto, Bruno, et al., "Face Liveness Detection Under Bad Illumination Conditions", 2011 18th IEEE Internatioal Conference on Image Processing, Unicamp, 2011 (Year: 2011), pp. 3557-3560.

Piva, Alessandro, "An Overview on Image Forensics", Hindawi Publishing Corporation, ISRN Signal Processing, vol. 2013, Article ID 496701, 2012 (Year: 2012), pp. 1-23.

Pollicelli, Debora, et al., "Wild Cetacea Identification Using Image Metadata", JCS&T, vol. 17, No. 1, Apr. 2017 (Year: 2017), pp. 79-84.

Porter, Glenn, et al., "Detection of Second-Generation Images Using an Assessment Criteria Method", Journal of Criminological Resaerch, Policy and Practice, vol. 1, No. 4, 2015 (Year: 2015), p. 207-222.

Thongkamwitoon, Thirapiroon, et al., "An Image Recapture Detection Algorithm Based on Learning Dictionaries of Edge Profiles", IEEE Transactions on Information Forensics and Security, vol. 10, No. 5, May 2015 (Year: 2015), pp. 953-968.

Wang, Kai, "A Simple and Effective Image-Statistics-Based Approach to Detecting Recaptured Images from LCD Screens", Digital Investigation, vol. 23, Elsevier, 2017 (Year: 2017), pp. 75-87.

Zhang, Zhiwei, et al., "A Face Antispoofing Database with Diverse Attacks", IEEE, 2012 (Year: 2012) pp. 26-31.

Bhowmik, Deepayan et al., "The Multimedia Blockchain: A Distributed and Tamper-Proof Media Transaction Framework", Digital Signal Processing (DSP), 2017 22nd International Conference on IEEE, 2017, 6 pages (Year: 2017).

Cao, Hong, et al., "Identification of Recaptured Photographs on LCD Screens", IEEE, 978-1-4244-4296-6, 2010, (Year: 2010), pp. 1790-1793.

Chinese Patent Application No. 201680057888.X, Office Action mailed Aug. 5, 2020, 9 pages.

De Las Heras, Lluis-Pere, et al., Use Case Visual Bag-of-Words Techniques for Camera Based Identity Document Classification, 2015 13th International Conference on Document Analysis and Recognition (ICDAR), IEEE, 978-1-4799-1805-8/15, 2015, (Year: 2015), pp. 721-725.

Drescher, Daniel, "Blockchain Basics: A Non-Technical Introduction in 25 Steps", 255 pages, APress, ISBN 978-1-4842-2603-2, 2017, 246 pages (Year: 2017).

European Patent Application No. 16833714.5, Supplementary European Search Report, mailed Nov. 13, 2018, 7 pages.

International Patent Application No. PCT/US2016/045089, an International Search Report and Written Opinion issued by Authorized Officer Lee W. Young, mailed Oct. 21, 2016, 8 pages.

International Patent Application No. PCT/US2018/053059, an International Search Report and Written Opinion issued by Authorized Officer Lee W. Young, mailed Dec. 10, 2018, 13 pages.

International Patent Application No. PCT/US2019/045245, an International Search Report and Written Opinion issued by Authorized Officer Harry C. Kim, mailed Feb. 11, 2020, 14 pages.

Ke, Yongzhen, et al., "Image Recapture Detection Using Multiple Features", International Journal of Multimedia and Ubiquitous Engineering, vol. 8, No. 5, ISSN: 1975-0080 IJMUE, 2013 (Year: 2013 ), pp. 71-82.

Ng, Tian-Tsong, et al., "Discrimination of Computer Synthesized or Recaptured Images from Real Images", Springer, : 10.1007/978-1-4614-0757-7 _ 10, 2013, (Year: 2013), pp. 275-309.

The TCP/IP Guide, tcpipguide.com, 2005, pp. 1-4.

Thongkamwitoon, Thirapiroon, et al., "An Image Recapture Detection Algorithm Based on Learning Dictionaries of Edge Profiles", IEEE Transactions on Information Forensics and Security, vol. 10, No. 5, May 2015, 10.1109/TIFS.2015.2392566, 2015, (Year: 2015), pp. 953-968.

Wang, Kai, "A Simple and Effective Image-Statistics-Based Approach to Detecting Recaptured Images from LCD Screens", Digital Investigation, vol. 23, Elsevier, 1742-2876, 2017, (Year: 2017), pp. 75-87.

* cited by examiner

SYSTEM AND METHOD FOR CAPTURING AUTHENTICATABLE DIGITAL MEDIA FILES ON CONNECTED MEDIA-CAPTURE DEVICES

CROSS REFERENCE TO RELATED APPLICATIONS

The present application claims priority to U.S. Provisional Patent Application No. 63/159,048, filed Mar. 10, 2021, entitled "SYSTEM AND METHOD FOR CAPTURING AUTHENTICATABLE DIGITAL MEDIA FILES ON CONNECTED MEDIA-CAPTURE DEVICES," the disclosure thereof incorporated by reference herein in its entirety.

BACKGROUND

The disclosed technology relates generally to the capture of digital media files, and more particularly some embodiments relate to the capture of authenticatable digital media files.

SUMMARY

Systems and methods for capturing authenticatable digital media files on connected media-capture devices are disclosed. In general, one aspect disclosed features a media-capture device, comprising: one or more sensors; a hardware processor; and a non-transitory machine-readable storage medium encoded with instructions executable by the hardware processor to perform a method comprising: initiating acquisition of one or more sensor data samples representing analog phenomena captured by the one or more sensors; receiving the one or more sensor data samples; responsive to receiving the one or more sensor data samples, encoding the one or more sensor data samples; generating a to-be-signed data structure comprising at least one of: the one or more encoded sensor data samples, or one or more cryptographic hashes of the one or more encoded sensor data samples; generating a cryptographic hash of the to-be-signed data structure; transmitting a time-stamping request to a time-stamping server, wherein the time-stamping request comprises the cryptographic hash of the to-be-signed data structure, and wherein the time-stamping server generates a signed time-stamp responsive to receiving the time-stamping request; generating a digital signature using the to-be-signed data structure, the signed time-stamp, a private cryptographic key, and a signed certificate for the corresponding public cryptographic key; and generating a second data structure comprising the one or more encoded or unencoded sensor data samples, the to-be-signed data structure, and the digital signature.

Embodiments of the system may include one or more of the following features. In some embodiments, the method further comprises storing the second data structure in a file system of the device. In some embodiments, the method further comprises generating auxiliary data based on the one or more encoded or unencoded sensor data samples; and generating a hash of the auxiliary data; adding the hash of the auxiliary data to the first data structure. In some embodiments, the method further comprises prior to initiating acquisition of the one or more sensor data samples, determining whether the certificate for the public key corresponding to the private cryptographic key has expired; and responsive to determining the certificate for the public key corresponding to the private cryptographic key has expired, disabling acquisition of the one or more sensor data samples. In some embodiments, the method further comprises, responsive to determining the certificate for the public key corresponding to the private cryptographic key has expired, generating a new cryptographic key pair comprising a new public key and a new private key, generating a certificate signing request for the new public key, signing the certificate signing request with the new private key, and transmitting the signed certificate signing request to a registration server; wherein, responsive to receiving the signed certificate signing request, the registration server validates eligibility of the media-capture device to receive a certificate, and responsive to a successful validation relays the signed certificate signing request to a certification server; wherein, responsive to receiving the related signed certificate signing request, the certification server issues a signed certificate for the new public key and relays the signed certificate to the registration server; wherein, responsive to receiving the signed certificate, the registration server relays signed certificate to the media-capture device; and responsive to receiving the signed certificate, storing the signed certificate and enabling acquisition of the one or more sensor data samples. In some embodiments, the certificate for the public key corresponding to the private cryptographic key has a validity window; and determining whether the certificate for the public key corresponding to the private cryptographic key has expired comprises comparing the certificate's validity window to a local time value generated by a local clock in the device. In some embodiments, the method further comprises, prior to determining whether the certificate for the public key corresponding to the private cryptographic key has expired: obtaining a trusted time value from the time-stamping server; and initiating the local clock with the trusted time value.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Digital media files, such as photos, videos, audio recordings, are created by media recording devices that digitize analog phenomena into binary information, then encode this binary information into files for storage, transport, or both.

Typically, the binary files that encode the digitization of the analog phenomenon carry additional information (typically called metadata) which provides additional information about the media file which may be helpful to the viewer. For example, this metadata may include the date and time when the media was captured and digitized or the location where that took place. Some of the metadata may be the result of the digitization of the analog phenomena (e.g. a capture device's location inferred from a radio transceiver that captures satellite or cellular signals and computes a device's location).

While the resulting media file, which carries both the digitized audiovisual phenomena and the metadata, ostensibly reflects a faithful reproduction of the analog environment that the media capture device digitized, there is typically no way for a downstream consumer of the media file to know that with any certainty. It is possible and in fact common for the binary information in media files to be manipulated without leaving evidence of manipulation. While several categories of manipulations are entirely benign, some manipulations may be intended to deceive the media consumer. For example, a manipulator may use several readily-available tools and emerging artificial intelligence (AI) technology to add or remove objects from a photo, swap faces in videos, or synthesize someone else's voice to replace words in a recorded speech. This may leave the media consumer defenseless against such manipulations, especially as the technology that enables manipulation grows more sophisticated to evade forensic detection techniques.

The disclosed embodiments provide credentials that allow a consumer of a digital media file captured using the disclosed technologies to ascertain whether the integrity of the file has been preserved since it was first created. That is, with these credentials, the user can ensure the file has not been altered. The integrity can be ascertained even if the system that issued the credentials by which the integrity is guaranteed no longer functions or exists.

Figure 1:
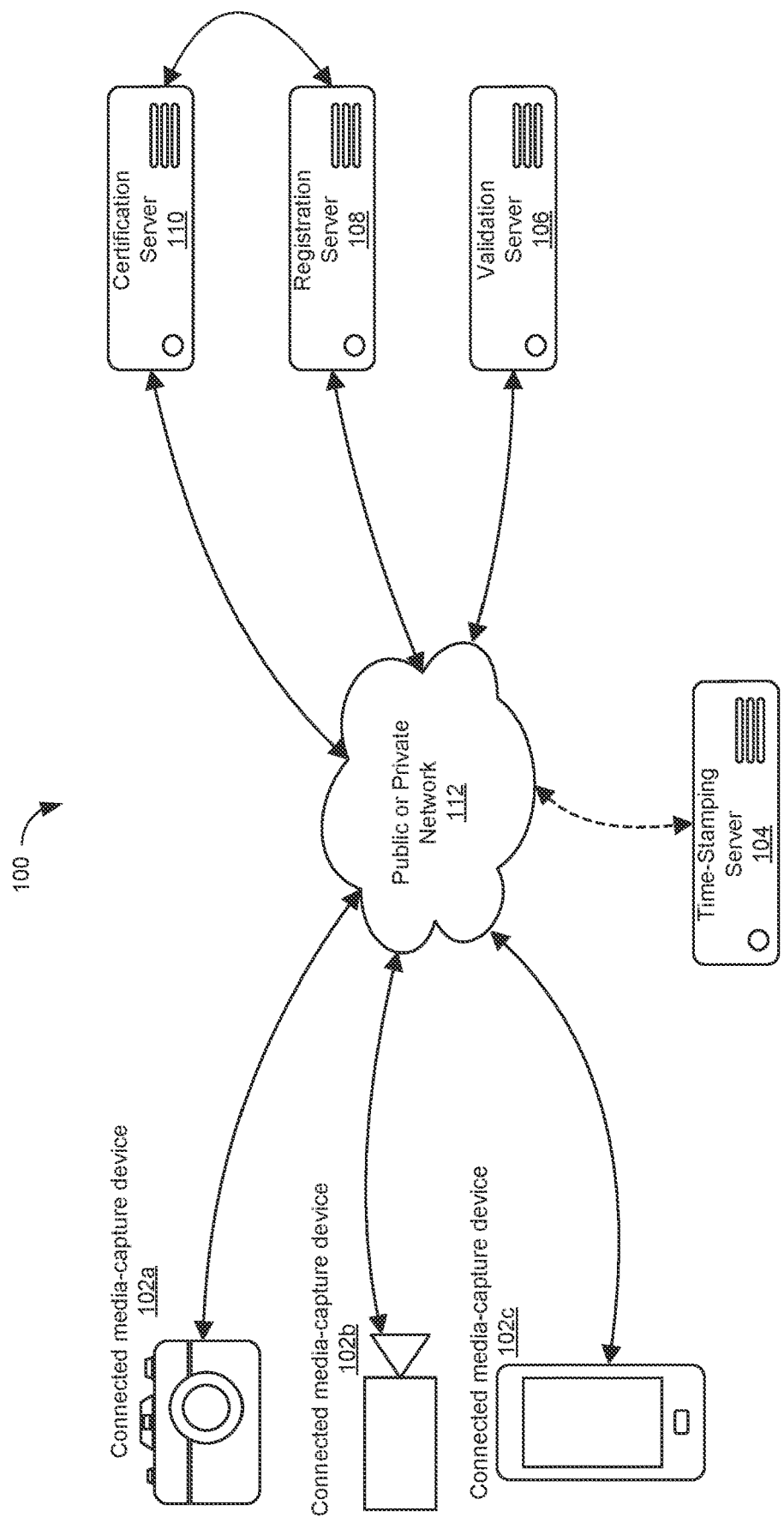
FIG. 1 is a block diagram of a system for capturing authenticatable digital media files on connected media-capture devices according to some embodiments of the disclosed technologies.

FIG. 1 is a block diagram of a system 100 for capturing authenticatable digital media files on connected media-capture devices according to some embodiments of the disclosed technologies. Referring to FIG. 1, the system 100 may include various types of network-connected media-capture devices 102a . . . 102n. For example, as depicted in FIG. 1, the devices 102 may include a digital camera 102a, a closed-circuit television camera (CCTV) 102b, a smartphone 102c, and other media capture devices. However, these devices here are only examples. The disclosed technologies may be utilized in any kind of media-capture device, and independently of what analog phenomena the device digitizes and records.

The system 100 may include a time-stamping server 104. The time-stamping server 104 may provide a trusted time value that media capture devices 102 may use to apply trusted time-stamps to the media files they create, thereby proving the existence of a particular piece of data at a given point in time.

The system 100 may include a registration server 108. The registration server 108 may authenticate and approve requests from media-capture devices for cryptographic credentials. The system 100 may include a certification server 110. The certification server 110 may issue the cryptographic credentials. The system 100 may include a validation server 106. The validation server 106 may confirm the validity of the cryptographic credentials.

The system 100 may communicate via a network 112. The network 112 may be public, private, or a combination thereof, and may include the Internet.

While the functions of the time-stamping server 104, registration server 108, certification server 110, validation server 106 are depicted separately, it should be understood that this is a separation of logical functions, and should not be construed as a mandate for a physical separation of these functions across different servers or machines. In some implementations, these functions may be combined together in various permutations or further subdivided as needed.

Figure 2:
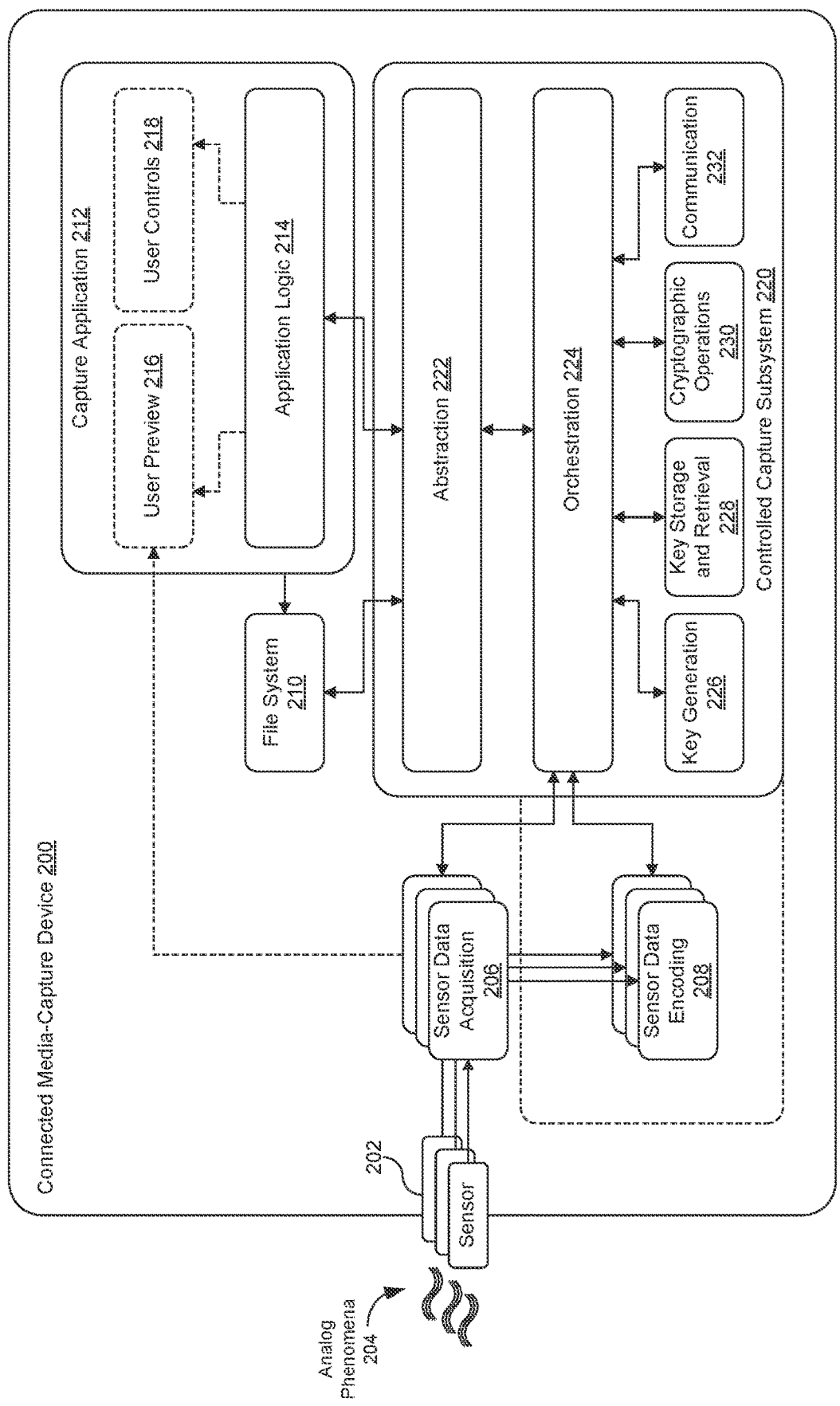
FIG. 2 is a block diagram of a connected media-capture device according to some embodiments of the disclosed technologies.

FIG. 2 is a block diagram of a connected media-capture device 200 according to some embodiments of the disclosed technologies. The media-capture device 200 may be implemented as described above. Referring to FIG. 2, the connected media-capture device 200 may include one or more sensors 202. Each sensor 202 may convert analog phenomena 204 into electrical signals. The analog phenomena 204 may include any analog phenomena, for example such as light, sound, temperature, location, and similar analog phenomena. The electrical signals may be analog or digital, depending on sensor type.

The core system of the media-capture device 200 may include one or more sensor data acquisition modules 206. The sensor data acquisition modules 206 may acquire and optionally preprocess the signals from sensors. The media-capture device 200 may include a different sensor data acquisition module 206 for each sensor 202, or one or more sensors 202 may share a data acquisition module 206. Each sensor data acquisition module 206 may be implemented in a dedicated or shared hardware block, software code that executes in a dedicated or shared processor, or a combination of both.

The core system of the media-capture device 200 may include one or more sensor data encoding modules 208. Each sensor data encoding module 208 may encode preprocessed sensor data into a final form. The encoding may compact the sensor data or change its representation in order to make it understandable by downstream recipients, whether human or machine.

The core system of the media-capture device 200 may include a file system 210. The file system 210 may store both ephemeral and non-ephemeral files, including, optionally, media files which may result from the recording activity of the connected media-capture device 200.

The media-capture device 200 may include a capture application (App) 212. The capture application 212 may initiate, control, and receive the results of a media capture operation. In some embodiments, the capture application 212 may be a standalone application that operates autonomously and automatically in the media-capture device 200.

In some embodiments, the capture application 212 may be a user-facing application designed to receive commands from an external actor (e.g., a human user) and relay information about the media capture operation. In such embodiments, the capture application 212 may feature a user control module 218 which is designed to enable an external actor to issue commands to the capture application 212 to effect the capture operation. Also in such embodiments, the capture application 212 may feature a user preview module 216. The user preview module 216 may create a presentation of the sensor data to an external actor that represents a digitized form of the analog phenomena 204. For example, the user preview module 216 in a camera application may present a representation of the data seen by the image sensor through the lens system to a human (e.g., a photographer) via a display subsystem. There may be multiple user preview modules 216 that correspond to different sensors 202 in the media-capture device 200, suitable for the analog phenomena 204 that each sensor 202 converts to electrical signals. In addition to the above-described optional functions, the capture application 212 may contain a core application logic 214 that represents its core logic.

The media-capture device 200 may include a controlled capture subsystem 220. The controlled capture subsystem 220 may oversee and control capture operations. The controlled capture subsystem 220 may be responsible for generating a final representation of the captured media along with data that can prove its integrity.

The media-capture device 200 may include an abstraction module 222. The abstraction module 222 may act as an interface to the capture application 212 and the file system 210.

The media-capture device 200 may include a key generation module 226. The key generation module 226 may generate cryptographic keys. The cryptographic keys may be used for generating cryptographic primitives such as digital signatures and similar cryptographic primitives.

The media-capture device 200 may include a key storage and retrieval module 228. The key storage and retrieval module 228 may provide non-volatile storage for the cryptographic keys generated by the key generation module 226. The key storage and retrieval module 228 may serve up the cryptographic keys for use by other functions.

The media-capture device 200 may include a cryptographic operations module 230. The cryptographic operations module 230 may generate cryptographic primitives such as digital signatures and cryptographic hashes over data it receives from other functions, and may use cryptographic keys when needed.

The media-capture device 200 may include a communication module 232. The communication module 232 may transmit and receive data over networks such as the public or private networks 112 of FIG. 1. For example, the communication module 232 may exchange data with the time-stamping server 104, the registration server 108, the certification server 110, the validation server 106 and/or other entities.

The media-capture device 200 may include an orchestration module 224. The orchestration module 224 may act as the core logic of the controlled capture subsystem 220.

The hierarchy and division of the modules of the connected media-capture device 200 are only logical. In various implementations, these modules may be merged together, subdivided further, and the like. The modules may span multiple physical, logical, or virtual hardware and software components within the media-capture device 200, as well as multiple security boundaries. The modules may be performed by dedicated hardware, by firmware executing in specialized or generic hardware, by software executing in specialized or generic processing hardware, or any combination thereof. Additionally, these logical modules may make use of hardware, firmware or software resources that are not explicitly depicted in FIG. 2. For example, the resources may include caches, buffers, system memory, and similar resources.

Figure 3:
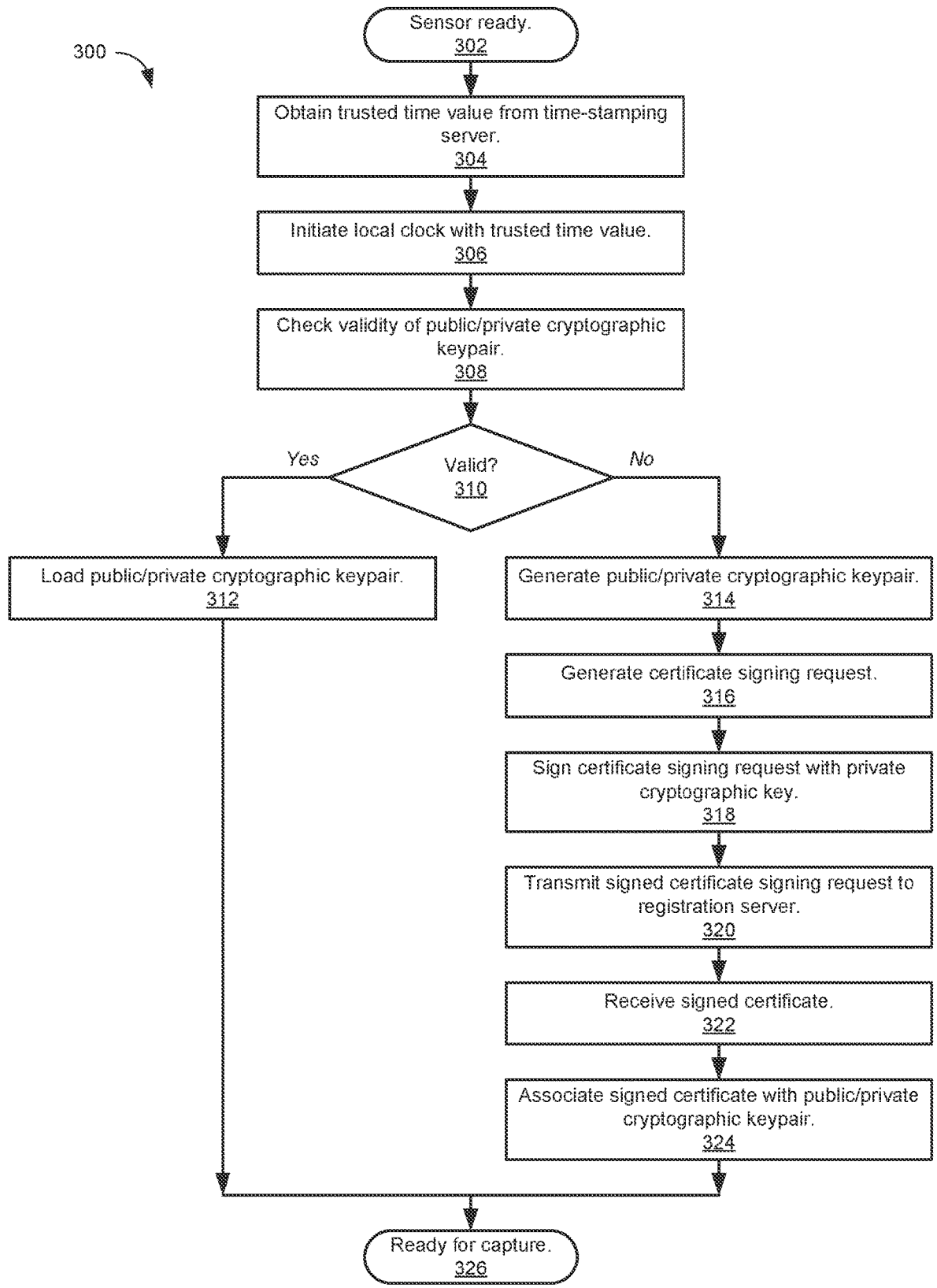
FIG. 3 is a flowchart illustrating a process for initializing a connected media-capture device according to some embodiments of the disclosed technologies.

FIG. 3 is a flowchart illustrating a process 300 for initializing a connected media-capture device according to some embodiments of the disclosed technologies. For example, the process 300 may be employed to initialize the connected media-capture device 200 of FIG. 2 prior to capturing authenticatable digital media files. The elements of the process 300 are presented in one arrangement. However, it should be understood that one or more elements of the process may be performed in a different order, in parallel, omitted entirely, and the like. Furthermore, the process 300 may include other elements in addition to those presented. For example, the process 300 may include error-handling functions if exceptions occur.

The process 300 may begin with the invocation of the application logic 214 of the capture application 212. In some embodiments, the invocation may be initiated by a user. In some embodiments, the invocation may be autonomously effected in the media-capture device 200 without an external agent or trigger. The invocation of the application logic 214 may be the result of the loading of the capture application 212 by an internal or external trigger, or the switching of the capture application 212 into a specialized capture mode (e.g., similar to the invocation of a "panorama" capture mode in a camera app).

The application logic 214 in turn may invoke the controlled capture subsystem 220 by sending a message to the abstraction module 222, which may pass configuration parameters as part of the invocation. The abstraction module 222 in turn may load and activate the orchestration module 224, which may pass configuration parameters in the process, such as parameters that define the desired characteristics for the encoded sensor data, for example the desired pixel width and height of a still photograph.

The orchestration module 224 may request the sensor data acquisition module 206 for one or more sensors 202 to initialize, and may pass configuration parameters in the process, such as the desired accuracy level of the sensor data. The sensor data acquisition module 206 for the initialized sensors 202 may signal its success in initializing the sensors 202 to the orchestration module 224. At this point the sensors 202 are ready for capture, as shown at 302 in FIG. 3.

Referring again to FIG. 2, if the capture application 212 is designed to be used by an external actor, for example a human user, the user preview module 216 may be started using messages from the orchestration module 224 to the application logic 214 via the abstraction module 222, which informs the application logic 214 that the sensor data is ready for presentation to the user from the sensor data acquisition modules 206.

With the orchestration module 224 loaded, and the user preview module 216 optionally operational, the orchestration module 224 may commence the process of preparing cryptographic credentials which will be used to apply integrity data to the captured media data.

Referring to FIG. 3, the process 300 may include obtaining a trusted time value from a time-stamping server, at 304. For example, referring again to FIGS. 1 and 2, the orchestration module 224 may obtain a trusted time value, e.g., from a local or remote time-stamping server 104 via the communication module 232.

Referring again to FIG. 3, the process 300 may include initiating a local clock with the trusted time value, at 306. For example, referring again to FIG. 2 the orchestration module 224 may initiate and maintain a local clock based on the trusted time value.

Referring again to FIG. 3, the process 300 may include checking the validity of a stored certificate for the public key of a stored public/private cryptographic key pair, at 308. Referring again to FIGS. 1 and 2, the orchestration module 224 may pass the current local time derived from the local clock, along with a validity window value, to the key storage and retrieval module 228. The orchestration module 224 may instruct the key storage and retrieval module 228 to return a handle to a key pair, and its signed certificate, that will be valid within the validity window. The key storage and retrieval module 228 may check for a key pair whose certificate is valid based on these and/or other parameters.

Referring again to FIG. 3, if the certificate for the public key of the key pair is valid, at 310, the process 300 may include loading the public/private cryptographic key pair, at 312. For example, referring again to FIG. 2, the key storage and retrieval module 228 may return a handle to a valid key pair, along with its associated signed certificate, to the orchestration module 224. The orchestration module 224 may then signal to the abstraction module 222 that it is ready to receive capture commands. Referring again to FIG. 3, at this point, the media-capture device may be ready for capture, at 326.

Alternatively, if the key pair is not valid, at 310, the process 300 may include generating a public/private cryptographic key pair, at 314. For example, referring again to FIG. 2, the orchestration module 224 may request the key generation module 226 to generate a new cryptographic key pair, passing along required attributes such as algorithm type and key length that may be expected by the certification server 110 of FIG. 1. Once the key generation module 226 completes the key generation process, it may signal the key storage and retrieval module 228 to store the newly-generated key pair. Once completed, the key storage and retrieval module 228 may inform the key generation module 226 of the successful completion of the storage operation, and the key generation module 226 in turn may inform the orchestration module 224 of the successful generation and storage of the new key pair, and pass along a handle to it.

Referring again to FIG. 3, the process 300 may include generating a certificate signing request, at 316. For example, referring again to FIGS. 1 and 2, the orchestration module 224 may compose the certificate signing request. The certificate signing request may include a data structure that includes required and optional information about the new key pair, which may be encoded in a way that is expected by the certification server 110. The certification server 110 may use the data structure to evaluate whether or not to issue a certificate for the public key of the new key pair. The orchestration module 224 may instruct the cryptographic operations module 230 to load the new key pair and get ready to generate a digital signature. In response, the cryptographic operations module 230 may load the new key pair material from the key storage and retrieval module 228, and may signal success to the orchestration module 224.

Referring again to FIG. 3, the process 300 may include signing the certificate signing request with the newly-generated private cryptographic key, at 318. For example, referring again to FIG. 2, the orchestration module 224 may issue a sign command to the cryptographic operations module 230, passing along the unsigned certificate signing request and the new key pair handle. The cryptographic operations module 230 may sign the unsigned certificate signing request data structure, may signal success to the orchestration module 224, and may return the signed certificate signing request data structure to the orchestration module 224.

Referring again to FIG. 3, the process 300 may include transmitting the signed certificate signing request to the registration server, at 320. For example, referring again to FIGS. 1 and 2, the orchestration module 224 may command the communication module 232 to obtain a signed certificate for the public key of the new key pair, passing along the signed certificate signing request. The communication module 232 may attempt to connect to the registration server 108. The registration server 108 may seek to ensure that the media-capture device 200 is authorized to obtain cryptographic credentials from the certification server 110. The registration server 108 may issue an authentication challenge to the media-capture device 200. The communication module 232 may respond to the authentication challenge. The authentication challenge may feature a small data structure such as a nonce, upon which the media-capture device 200 may apply some computation and return an authentication token. The registration server 108 may signal a successful authentication attempt back to the communication module 232, indicating that the registration server 108 is ready to receive and process requests for cryptographic credentials.

The communication module 232 may send the registration server 108 a request for a signed certificate, passing along the signed certificate signing request. The registration server 108 may receive the signed certificate signing request, and may prepare the signed certificate signing request for transmission to the certification server 110. The method by which the certification server 110 is made aware of the presence of a pending signed certificate signing request at the registration server 108 may vary by implementation, depending on the security objectives of the system. In some implementations, the registration server 108 may initiate a connection to the certification server 110 and transmit the signed certificate signing request. In other implementations, the certification server 110 may poll the registration server 108 at some interval to check for any signed certificate signing requests that are awaiting certification by the certification server 110. If the registration server 108 finds a pending signed certificate signing request, the registration server 108 may signal this to the certification server 110 and may transmit the signed certificate signing request to the certification server 110.

Upon receiving the signed certificate signing request, the certification server 110 may validate its parameters, including the presence and validity of mandatory and optional information about the new key pair and its subject. The subject may be the unique identity of that specific media capture device 200 that generated the signing request, the identity of the capture application 212 (for example, a name and software version number), the identity of the controlled capture subsystem 220 (for example, a name and software version number), or similar information. If the parameters are valid, the certification server 110 may compose an unsigned certificate which binds the new key pair to its subject, sets a validity period during which it may be used, and may place restrictions on what the new key pair may be used for.

Then, the certification server 110 may sign the unsigned certificate using its own private key, and may signal the success of the operation back to the registration server 108, passing along the signed certificate. In some embodiments, the signed certificate may be in an industry-standard format such as X.509v3. In some embodiments, both the registration server 108 and the certification server 110 may record the receipt of the signed certificate signing request and the issuing of the signed certificate in internal databases.

Referring again to FIG. 3, the process 300 may include receiving the signed certificate at the media-capture device, at 322. For example, referring again to FIGS. 1 and 2, upon receipt of the signed certificate signing request, the registration server 108 may signal success back to the communication module 232 of the media-capture device 200, passing along the signed certificate. The communication module 232 may in turn signal success back to the orchestration module 224, and may pass the signed certificate to the orchestration module 224.

Referring again to FIG. 3, the process 300 may include associating the signed certificate with the public/private cryptographic key pair, at 324. For example, referring again to FIG. 2, having obtained the signed certificate for the new key pair, the orchestration module 224 may instruct the key storage and retrieval module 228 to store the signed certificate and associate it with the new key pair via the new key pair handle. The key storage and retrieval module 228 may signal success back to the orchestration module 224, passing along the handle to the new valid key pair along with its signed certificate. The orchestration module 224 may then signal its readiness for capture operations back to the abstraction module 222.

Referring again to FIG. 3, the media-capture device may be ready for capture, at 326. For example, referring again to FIG. 2, with the orchestration module 224 ready for capture operations, the abstraction module 222 may signal readiness back to the application logic 214. If the capture application is designed to be used by an external actor such as a human user, the application logic 214 may instruct the user controls module 218 to enable the capture controls of the media-capture device 200. In response, the capture controls 218 may format and make available those controls to the user via the user preview module 216.

Figure 4A:
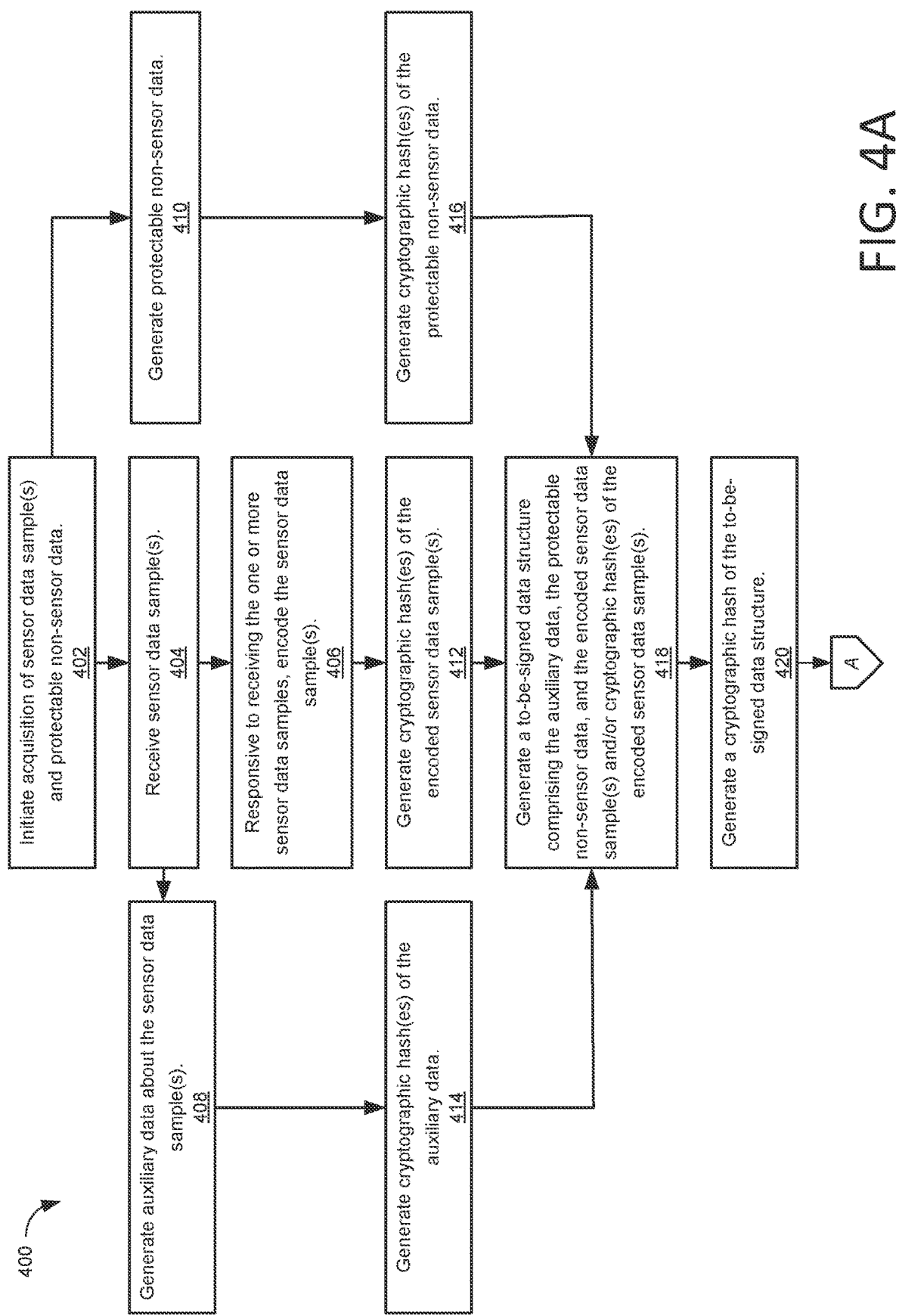
FIGS. 4A and 4B are a flowchart illustrating a process for capturing authenticatable digital media files with a connected media-capture device according to some embodiments of the disclosed technologies.
Figure 4B:
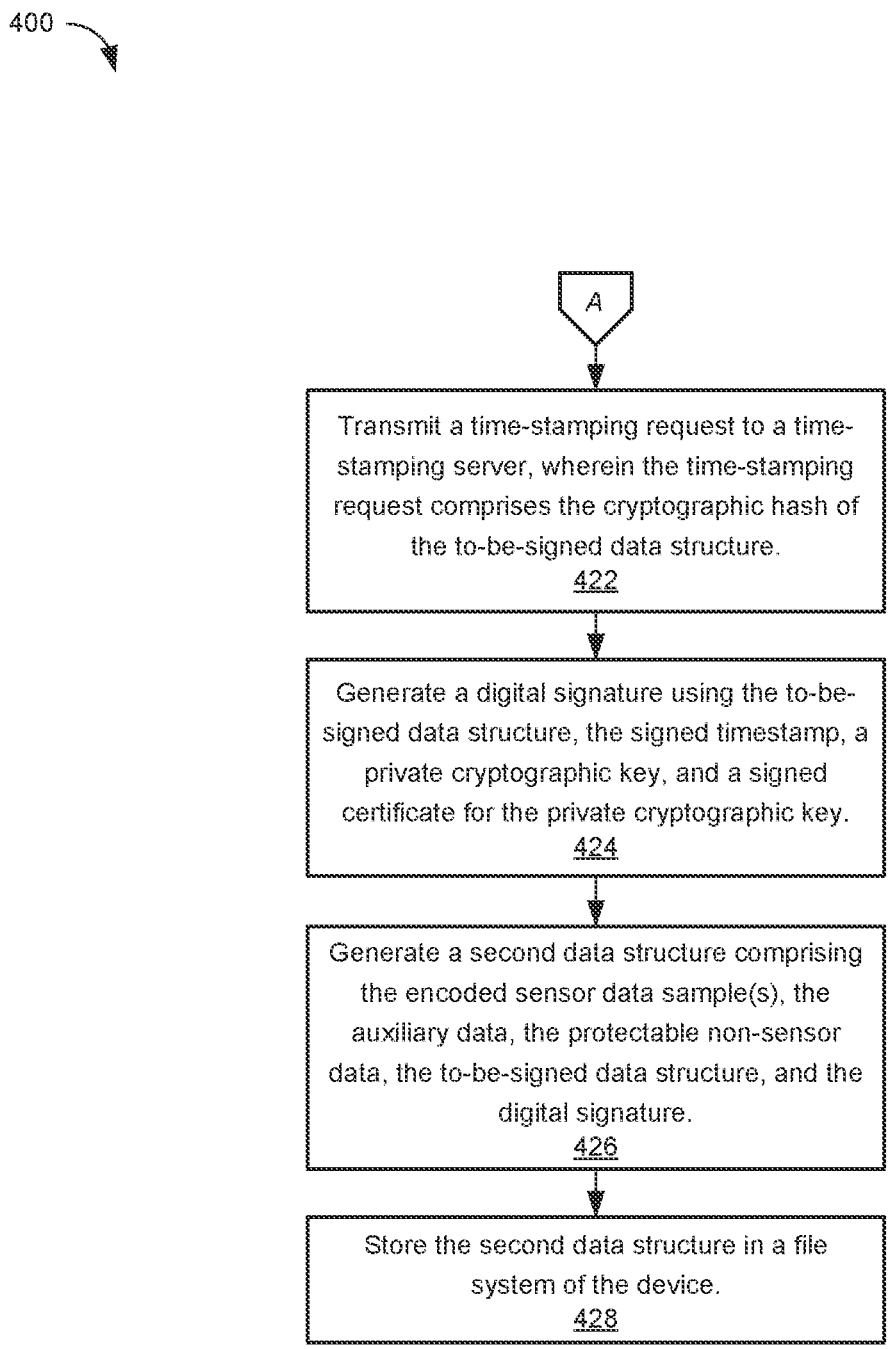

FIGS. 4A and 4B are a flowchart illustrating a process 400 for capturing authenticatable digital media files with a connected media-capture device according to some embodiments of the disclosed technologies. For example, the process 400 may be employed with the connected media-capture device 200 of FIG. 2 to capture authenticatable digital media files. The elements of the process 400 are presented in one arrangement. However, it should be understood that one or more elements of the process may be performed in a different order, in parallel, omitted entirely, and the like. Furthermore, the process 400 may include other elements in addition to those presented. For example, the process 400 may include error-handling functions if exceptions occur, and the like.

The capture process 400 is described in terms of capturing and encoding a snapshot in time of the value of one or more sensors. In this example, a single "capture" command may take place once, and is expected to return a result. For example, the result may include a two-dimensional array of pixel values representing an image digitized by an image sensor around a particular moment in time, or the value of a location sensor or a temperature sensor around a particular moment in time.

However, the disclosed technology also applies to other forms of capture that aggregate together multiple sensor readings into a single encoded sensor data value. The single value may be a composite of multiple individual readings from the sensor, anchored around a moment in time. For example, a single, instantaneous "capture" command may trigger a process by which multiple frames of image sensor data are acquired then combined into a single encoded image, for noise reduction or other image enhancement purposes. A similar process may be applied to a "burst" operation, which is usually accomplished by holding down a capture button. This burst operation results in multiple single encoded sensor data values.

Referring again to FIG. 2, while awaiting a capture command, the orchestration module 224 regularly monitors the validity of the certificate for the public key of the key pair to be used for signing, by comparing the public key certificate's validity period against the local time. While the certificate is valid, the orchestration module 224 continues to wait for a capture command. If the certificate expires, then the orchestration module 224 signals to the abstraction module 222 its lack of readiness for a capture command. The abstraction module 222 in turn signals the application logic 214, which disables the capture controls 218. The orchestration module 224 then generates and signs a key pair, for example as described above regarding the initialization process 300 of FIG. 3. Once the new signed key pair is ready and valid, the orchestration module 224 signals its readiness for a capture command to the abstraction module 222, which likewise signals the application logic 214, which in turn re-enables the capture controls 218.

Referring to FIG. 4A, the capture process 400 may begin with initiating the acquisition of one or more preprocessed sensor data samples representing analog phenomena captured by the sensor(s), at 402. For example, referring to FIG. 2, the application logic 214 may issue a capture command to the abstraction module 222, which may include configuration parameters that set boundaries for the resulting capture. As described above, the capture command may be the result of an autonomously-initiated capture operation, or may be the result of the action of an external actor such as a human user. The application logic may disable the capture controls 218 during the capture operation.

The abstraction module 222 may pass along the capture command and any configuration parameters to the orchestration module 224. The orchestration module 224 may then query each sensor data acquisition module 206 for one or more sensor readings, and may pass along configuration parameters as part of the query.

A single capture operation may include the acquisition of encoded sensor data snapshot values from multiple sensors 202 at the same time. For example, for a media-capture device capable of capturing still photos, a still photo capture may include data values from an image sensor, a location sensor, a depth sensor, a pressure sensor, a magnetometer, and similar sensors. The orchestration module 224 may acquire data from multiple different sensor types via corresponding sensor data acquisition modules 206 and sensor data encoding modules 208, and may collate their data into a single file container at the end of the capture operation. Referring again to FIG. 4A, the capture process 400 may include receiving one or more preprocessed sensor data samples captured by the sensor(s), at 404.

The capture process 400 may include, responsive to receiving the one or more preprocessed sensor data samples, encoding them using the coding mechanism expected by downstream recipients of the media file, at 406. For example, referring again to FIG. 2, the orchestration module 224 may command one or more sensor data encoding modules 208 to encode the one or more preprocessed sensor data samples received from one or more sensor data acquisition modules 206, and may pass along encoding parameters in the process. After the encoding, the sensor data encoding modules 208 may signal success back to the orchestration module 224, returning the encoded sensor data snapshot value corresponding to each sensor.

An encoded sensor data snapshot value may have multiple dimensions. For example, an encoded sensor data snapshot value may be a dimensionless unitary value, a one-dimensional array of values, a two-dimensional matrix of values, a three-dimensional tensor of values, and values having other dimensions. Whatever the dimensionality, the data may represent a single encoded value of the sensor reading anchored at a specific moment in time.

A single capture operation may include the capture of encoded sensor data snapshot values from multiple sensors 202 at the same time. For example, for a media-capture device capable of capturing still photos, a still photo capture may include data values from an image sensor, a location sensor, a depth sensor, a pressure sensor, a magnetometer, and similar sensors. The orchestration module 224 may acquire data from multiple different sensor types via corresponding sensor data acquisition modules 206 and sensor data encoding modules 208, and may collate their data into a single file container at the end of the capture operation.

Referring again to FIG. 4A, the capture process 400 may include, responsive to receiving the one or more sensor data samples, the generation of auxiliary data, at 408. As used herein the term "auxiliary data" refers to data about the encoded sensor data snapshot values received from the sensor data encoding modules 208 that may help a downstream recipient, whether machine or human, to better understand, evaluate, or process the encoded sensor data snapshot value. For example, referring again to FIG. 2, the orchestration module 224 may generate the auxiliary data.

Referring again to FIG. 4A, the capture process 400 may include the generation of protectable non-sensor data, at 410. As used herein the term "protectable non-sensor data" refers to data whose integrity needs to be protected as part of the overall media file container, but which does not originate from the digitization of an analog phenomenon captured by a sensor. For example, referring again to FIG. 2, the orchestration module 224 may generate protectable non-sensor data, which may be specific to attributes of the connected-media capture device or the type of file container or format which will encapsulate the capture media.

Referring again to FIG. 4A, the capture process 400 may include, responsive to receiving the encoded sensor data snapshot values corresponding to each sensor, generating one or more cryptographic hashes of the encoded sensor data snapshot values, at 412. For example, referring again to FIG. 2, the orchestration module 224 may engage the cryptographic operations module 230 to generate a cryptographic hash covering the encoded sensor data corresponding to each sensor, or multiple cryptographic hashes each covering a portion of the bytes representing the encoded sensor data corresponding to each sensor.

Referring again to FIG. 4A, the capture process 400 may include, upon the generation of auxiliary data for each encoded sensor data snapshot value, generating one or more cryptographic hashes of the auxiliary data, at 414. For example, referring again to FIG. 2, the orchestration module 224 may engage the cryptographic operations modules 230 to generate a cryptographic hash covering the auxiliary data corresponding to each encoded sensor data snapshot value, or multiple cryptographic hashes each covering a portion of the bytes representing the auxiliary data.

Referring again to FIG. 4A, the capture process 400 may include, upon the generation of protectable non-sensor data, generating one or more cryptographic hashes of the protectable non-sensor data, at 416. This protectable non-sensor data may be needed by a downstream recipient, whether machine or human, to properly decode and interpret the contents of the media file container. For example, referring again to FIG. 2, the orchestration module 224 may engage the cryptographic operations module 230 to generate a cryptographic hash covering the protectable non-sensor data, or multiple cryptographic hashes each covering a portion of the bytes representing the protectable non-sensor data.

Referring again to FIG. 4A, the capture process 400 may include generating a "to-be-signed" data structure containing the data and/or the cryptographic hashes of the data that is to be protected by the digital signature, at 418. For example, referring again to FIG. 2, the orchestration module 224 may generate a data structure that may be a composite of one or more encoded sensor data snapshot values, one or more associated auxiliary data, one or more protectable non-sensor data, and/or the cryptographic hashes of each. The orchestration module 224 may format this "to-be-signed" data structure in a way that complies with the expectations of downstream recipients, for example the tools that may perform authentication and verification of the signed data.

Referring again to FIG. 4A, the capture process 400 may include generating a cryptographic hash of the "to-be-signed" data structure, at 420. For example, referring again to FIGS. 1 and 2, the orchestration module 224 may then engage the cryptographic operations module 230 to hash the "to-be-signed" data structure. The orchestration module 224 may use the resulting hash to compose a time-stamping request, then engage the communication module 232 to obtain a signed time-stamp based on that time-stamping request from the time-stamping server 104, proving the existence of the data present in the "to-be-signed" data structure at that moment in time.

Referring to FIG. 4B, the capture process 400 may include transmitting the time-stamping request containing the hash of the "to-be-signed" data structure to a time-stamping server, wherein the time-stamping server generates a signed time-stamp responsive to receiving the time-stamping request corresponding to the "to-be-signed" data structure, at 422. For example, referring again to FIGS. 1 and 2, after an authentication challenge flow that may occur, the communication module 232 may transmit the time-stamping request to the time-stamping server 104, which generates the signed time-stamp, and returns the signed time-stamp to the communication module 232 of the media-capture device. The communication module 232 in turn may relay the signed time-stamp to the orchestration module 224.

Referring again to FIG. 4B, the capture process 400 may include generating a digital signature using the "to-be-signed" data structure, the signed time-stamp, a private cryptographic key, and a signed certificate for the corresponding public cryptographic key, at 424. For example, referring again to FIG. 2, the orchestration module 224 may command the cryptographic operations module 230 to create a digital signature using a sign command that includes the following parameters: a handle to the "to-be-signed" data structure, the signed time-stamp, the valid key pair handle for the key that should be used to sign, the signed certificate for that the public key of that key pair, and/or a partial or complete certificate chain for that key (e.g., a chain of valid certificates up to a self-signed root certificate). Once the cryptographic operation module 230 creates the digital signature, it may signal success back to the orchestration module 224 and return the signature.

Referring again to FIG. 4B, the capture process 400 may include generating a second data structure containing the elements that will be written to the media file container, and which may comprise the encoded sensor data snapshot values from each sensor, the auxiliary data associated with each encoded sensor data value, protectable non-sensor data, the "to-be-signed" data structure, and the digital signature, at 426. For example, referring again to FIG. 2, the orchestration module 224 may use the encoded sensor data snapshot values from each sensor, the auxiliary data associated with each encoded sensor data value, protectable non-sensor data, the "to-be-signed" data structure, and the digital signature to compose a data structure which is to be written to a file in the file system 210.

While the process 400 describes the use of sensor data samples, auxiliary data about the sensor data samples, and protectable non-sensor data, various embodiments may include only the sensor data samples, only the sensor data samples and the auxiliary data about the sensor data samples, only the protectable non-sensor data, or any combination thereof.

Referring again to FIG. 4B, the capture process 400 may include storing the second data structure in a file system of the device, at 428. For example, referring again to FIG. 2, once the orchestration module 224 finishes composing the second data structure, it may command the abstraction module 222 to write the data structure to a file in the file system 210, passing a handle for the data structure in the process. The abstraction module 222 may write the file to the file system 210, which signals success, passing back a handle to the file.

The abstraction module 222 may then signal the success of the capture operation back to the application logic 214, passing the file handle for the container file that houses the captured media and the associated cryptographic authentication data. The application logic 214 may then signal the success of the capture operation to the user via the user preview 216, and may re-enable the capture controls 218 for the user.

Once the file is available on the file system 210, it may be shared with other modules inside the media-capture device 200, or shared with external devices, services, or human actors for consumption and evaluation. A downstream recipient may use digital signature validation tools to verify that the data protected by the digital signature (i.e. the "to-be-signed" data structure, and the data that it in turn protects) has not been modified since the time of the creation of the digital signature.

More importantly, because the file contains a signed time-stamp and a signed certificate for the public key (either directly or as part of the digital signature), a downstream validator can validate the digital signature even after the key pair which was used to create the digital signature has expired or is no longer valid. That's because the signed time-stamp guarantees that the digital signature was created while the signing key pair still had a valid public key certificate, and the two are linked by the hash of the first data structure.

Figure 5:
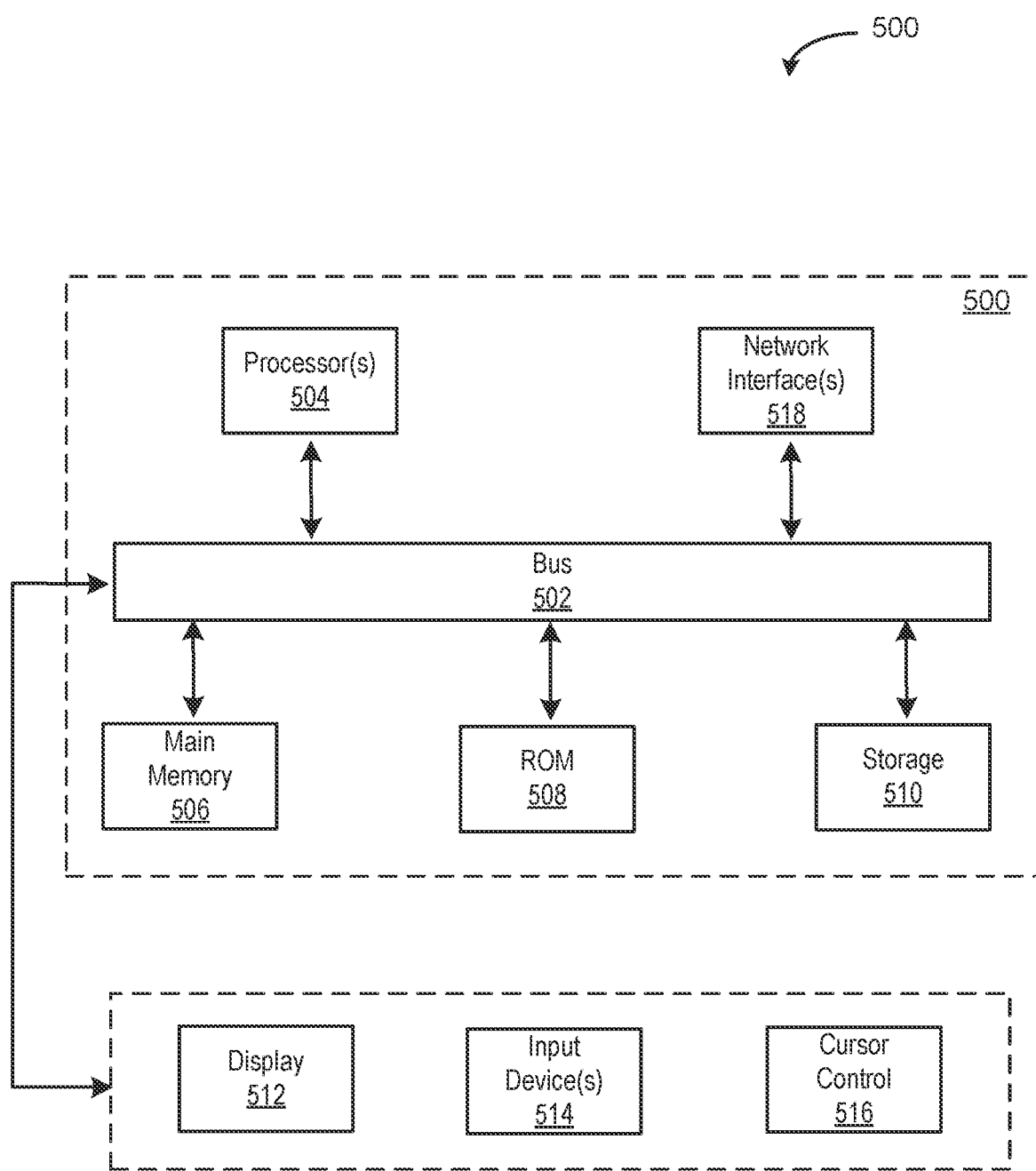
FIG. 5 is an example computing component that may be used to implement various features of embodiments described in the present disclosure.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, which may have entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or a WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A media-capture device, comprising:
one or more sensors;
a hardware processor; and
a non-transitory machine-readable storage medium encoded with instructions executable by the hardware processor to perform a method comprising:
  initiating acquisition of one or more sensor data samples representing analog phenomena captured by the one or more sensors;
  receiving the one or more sensor data samples;
  responsive to receiving the one or more sensor data samples, encoding the one or more sensor data samples;
  generating a to-be-signed data structure comprising at least one of:
    the encoded one or more sensor data samples, or
    one or more cryptographic hashes of the encoded one or more sensor data samples;
  generating a cryptographic hash of the to-be-signed data structure;
  transmitting a time-stamping request to a time-stamping server, wherein the time-stamping request comprises the cryptographic hash of the to-be-signed data structure, and wherein the time-stamping server generates a signed time-stamp responsive to receiving the time-stamping request;
  generating a digital signature using the to-be-signed data structure, the signed time-stamp, a private cryptographic key, and a signed certificate for a public cryptographic key corresponding to the private cryptographic key; and
  generating a second data structure comprising the encoded one or more sensor data samples or unencoded sensor data samples, the to-be-signed data structure, and the digital signature.

2. The media-capture device of claim 1, the method further comprising:
storing the second data structure in a file system of the media-capture device.

3. The media-capture device of claim 1, the method further comprising:
generating auxiliary data based on the encoded one or more encoded sensor data samples or unencoded sensor data samples;
generating a hash of the auxiliary data; and
adding the hash of the auxiliary data to the first to-be-signed data structure.

4. The media-capture device of claim 1, the method further comprising:
prior to initiating acquisition of the one or more sensor data samples, determining whether the signed certificate for the public cryptographic key corresponding to the private cryptographic key has expired; and
responsive to determining the certificate for the public cryptographic key corresponding to the private cryptographic key has expired, disabling acquisition of the one or more sensor data samples.

5. The media-capture device of claim 4, the method further comprising:
responsive to determining the certificate for the public cryptographic key corresponding to the private cryptographic key has expired, generating a new cryptographic key pair comprising a new public key and a new private key, generating a certificate signing request for the new public key, signing the certificate signing request with the new private key, and transmitting the signed certificate signing request to a registration server;
wherein, responsive to receiving the signed certificate signing request, the registration server validates eligibility of the media-capture device to receive a certificate, and responsive to a successful validation, relays the signed certificate signing request to a certification server;
wherein, responsive to receiving the relayed signed certificate signing request, the certification server issues a signed certificate for the new public key and relays the signed certificate to the registration server;
wherein, responsive to receiving the signed certificate, the registration server relays the signed certificate to the media-capture device; and
responsive to receiving the signed certificate, storing the signed certificate and enabling acquisition of the one or more sensor data samples.

6. The media-capture device of claim 4, wherein:
the certificate for the public cryptographic key corresponding to the private cryptographic key has a validity window; and
determining whether the certificate for the public cryptographic key corresponding to the private cryptographic key has expired comprises comparing the validity window to a local time value generated by a local clock in the media-capture device.

7. The media-capture device of claim 6, further comprising, prior to determining whether the certificate for the public cryptographic key corresponding to the private cryptographic key has expired:
obtaining a trusted time value from the time-stamping server; and
initiating a local clock with the trusted time value.

8. A non-transitory machine-readable storage medium encoded with instructions executable by a hardware processor of a computing component, the non-transitory machine-readable storage medium comprising instructions to cause the hardware processor to perform a method for a media-capture device having one or more sensors, the method comprising:
initiating acquisition of one or more sensor data samples representing analog phenomena captured by the one or more sensors;
receiving the one or more sensor data samples;
responsive to receiving the one or more sensor data samples, encoding the one or more sensor data samples;
generating a to-be-signed data structure comprising at least one of:
  the encoded one or more sensor data samples, or
  one or more cryptographic hashes of the encoded one or more sensor data samples;
generating a cryptographic hash of the to-be-signed data structure;
transmitting a time-stamping request to a time-stamping server, wherein the time-stamping request comprises the cryptographic hash of the to-be-signed data structure, and wherein the time-stamping server generates a signed time-stamp responsive to receiving the time-stamping request;
generating a digital signature using the to-be-signed data structure, the signed time-stamp, a private cryptographic key, and a signed certificate for a public cryptographic key corresponding to the private cryptographic key; and generating a second data structure comprising the encoded one or more sensor data samples or unencoded sensor data samples, the to-be-signed data structure, and the digital signature.

9. The non-transitory machine-readable storage medium of claim 8, the method further comprising:
storing the second data structure in a file system of the media-capture device.

10. The non-transitory machine-readable storage medium of claim 8, the method further comprising:
generating auxiliary data based on the encoded one or more sensor data samples or unencoded sensor data samples;
generating a hash of the auxiliary data; and
adding the hash of the auxiliary data to the to-be-signed data structure.

11. The non-transitory machine-readable storage medium of claim 8, the method further comprising:
prior to initiating acquisition of the one or more sensor data samples, determining whether the signed certificate for the public cryptographic key corresponding to the private cryptographic key has expired; and
responsive to determining the certificate for the public cryptographic key corresponding to the private cryptographic key has expired, disabling acquisition of the one or more sensor data samples.

12. The non-transitory machine-readable storage medium of claim 11, the method further comprising:
responsive to determining the certificate for the public cryptographic key corresponding to the private cryptographic key has expired, generating a new cryptographic key pair comprising a new public key and a new private key, generating a certificate signing request for the new public key, signing the certificate signing request with the new private key, and transmitting the signed certificate signing request to a registration server;
wherein, responsive to receiving the signed certificate signing request, the registration server validates eligibility of the media-capture device to receive a certificate, and responsive to a successful validation, relays the signed certificate signing request to a certification server;
wherein, responsive to receiving the relayed signed certificate signing request, the certification server issues a signed certificate for the new public key and relays the signed certificate to the registration server;
wherein, responsive to receiving the signed certificate, the registration server relays the signed certificate to the media-capture device; and
responsive to receiving the signed certificate, storing the signed certificate and enabling acquisition of the one or more sensor data samples.

13. The non-transitory machine-readable storage medium of claim 11, wherein:
the private cryptographic key has a validity window; and
determining whether the private cryptographic key has expired comprises comparing the validity window to a local time value generated by a local clock in the media-capture device.

14. The non-transitory machine-readable storage medium of claim 13, further comprising, prior to determining whether the private cryptographic key has expired:

obtaining a trusted time value from the time-stamping server; and
initiating a local clock with the trusted time value.

15. A computer-implemented method for a media-capture device having one or more sensors, the computer-implemented method comprising:
initiating acquisition of one or more sensor data samples representing analog phenomena captured by the one or more sensors;
receiving the one or more sensor data samples;
responsive to receiving the one or more sensor data samples, encoding the one or more sensor data samples;
generating a to-be-signed data structure comprising at least one of:
the encoded one or more sensor data samples, or
one or more cryptographic hashes of the encoded one or more sensor data samples;
generating a cryptographic hash of the to-be-signed data structure;
transmitting a time-stamping request to a time-stamping server, wherein the time-stamping request comprises the cryptographic hash of the to-be-signed data structure, and wherein the time-stamping server generates a signed time-stamp responsive to receiving the time-stamping request;
generating a digital signature using the to-be-signed data structure, the signed time-stamp, a private cryptographic key, and a signed certificate for a public cryptographic key corresponding to the private cryptographic key; and
generating a second data structure comprising the one or more sensor encoded or unencoded data samples, the to-be-signed data structure, and the digital signature.

16. The computer-implemented method of claim 15, further comprising:
storing the second data structure in a file system of the media-capture device.

17. The computer-implemented method of claim 15, further comprising:
generating auxiliary data based on the encoded one or more sensor data samples or unencoded sensor data samples;
generating a hash of the auxiliary data; and
adding the hash of the auxiliary data to the to-be-signed data structure.

18. The computer-implemented method of claim 15, further comprising:
prior to initiating acquisition of the one or more sensor data samples, determining whether the signed certificate for the public cryptographic key corresponding to the private cryptographic key has expired; and
responsive to determining the certificate for the public cryptographic key corresponding to the private cryptographic key has expired, disabling acquisition of the one or more sensor data samples.

19. The computer-implemented method of claim 18, further comprising:
responsive to determining the certificate for the public cryptographic key corresponding to the private cryptographic key has expired, generating a new cryptographic key pair comprising a new public key and a new private key, generating a certificate using the public key of the further private and public cryptographic key pair, signing the certificate signing request with the new private key, and transmitting the signed certificate signing request to a registration server;

wherein, responsive to receiving the signed certificate signing request, the registration server validates eligibility of the media-capture device to receive a certificate, and responsive to a successful validation relays the signed certificate signing request to a certification server;

wherein, responsive to receiving the relayed signed certificate signing request, the certification server issues a signed certificate for the new public key and relays the signed certificate to the registration server;

wherein, responsive to receiving the signed certificate, the registration server relays the signed certificate to the media-capture device; and responsive to receiving the signed certificate, storing the signed certificate and enabling acquisition of the one or more sensor data samples.

20. The computer-implemented method of claim 18, wherein:

the private cryptographic key has a validity window; and determining whether the private cryptographic key has expired comprises comparing the validity window to a local time value generated by a local clock in the media-capture device.

* * * * *

UNITED STATES PATENT AND TRADEMARK OFFICE
CERTIFICATE OF CORRECTION

| | |
|---|---|
| PATENT NO. | : 12,231,577 B2 |
| APPLICATION NO. | : 17/685877 |
| DATED | : February 18, 2025 |
| INVENTOR(S) | : Sherif Hanna et al. |

Page 1 of 1

It is certified that error appears in the above-identified patent and that said Letters Patent is hereby corrected as shown below:

In the Claims

Column 17, Line 48, (Claim 3, Line 4), change "more encoded sensor" to --more sensor--;

Column 17, Line 51, (Claim 3, Line 7), change "the first" to --the--.

Signed and Sealed this
Eighth Day of April, 2025

Coke Morgan Stewart
*Acting Director of the United States Patent and Trademark Office*